Patented Dec. 30, 1947

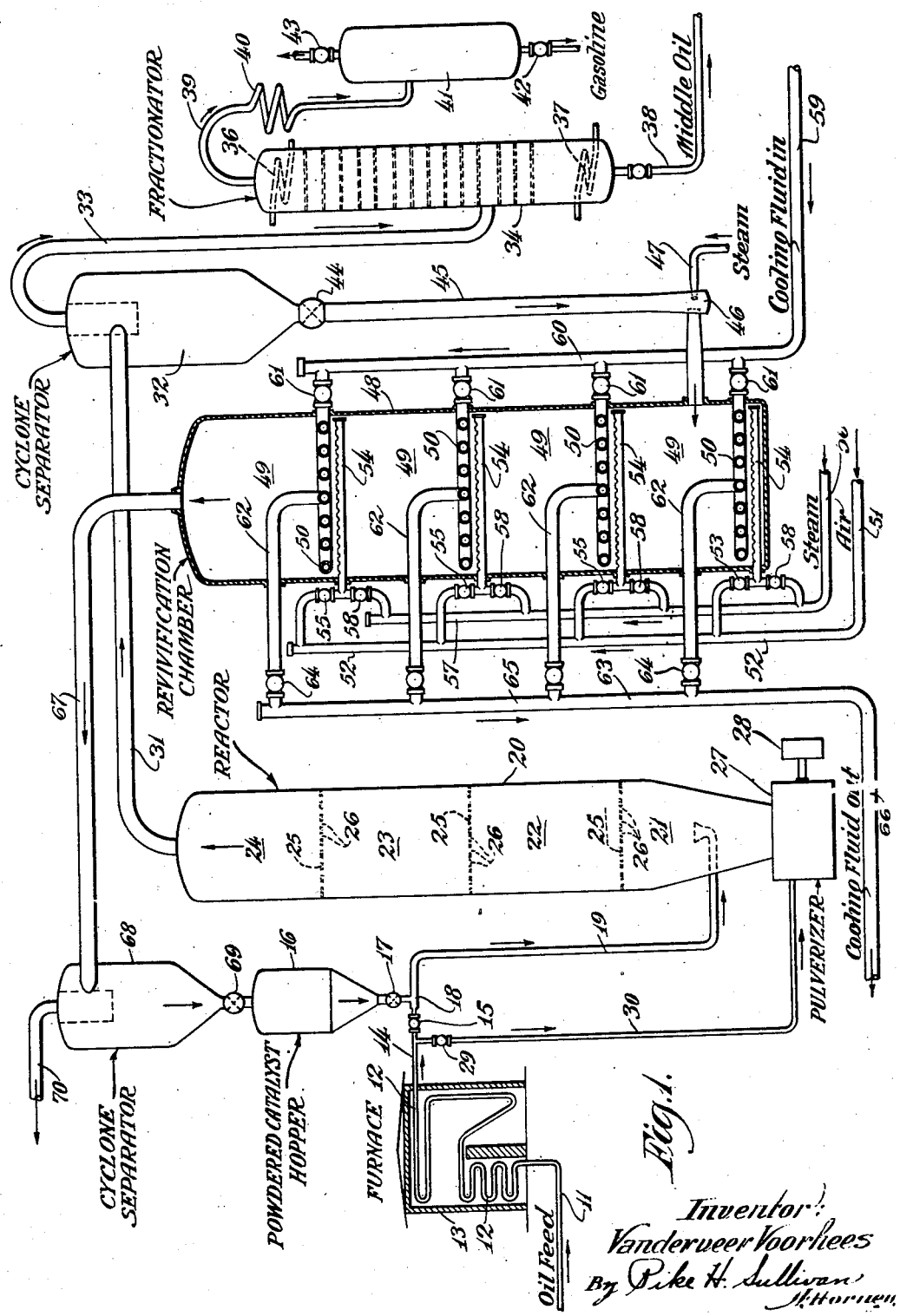

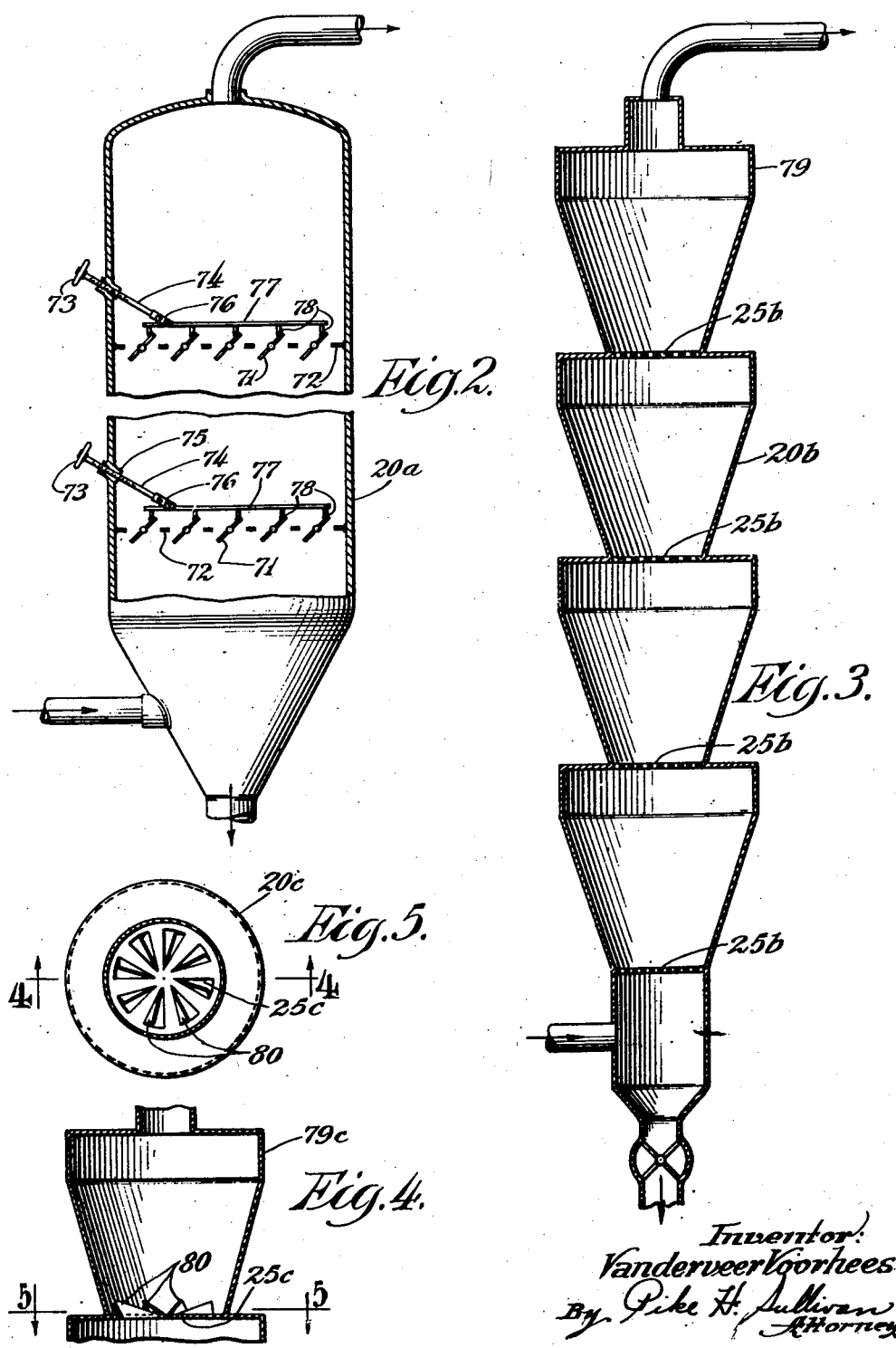

2,433,798

UNITED STATES PATENT OFFICE 2,433,798

CATALYTIC HYDROCARBON CONVERSION PROCESS AND APPARATUS THEREFOR

Vanderveer Voorhees, Hammond, Ind., assignor to Standard Oil Company, Chicago, Ill., a corporation of Indiana Application July 31, 1940, Serial No. 348,709

4 Claims. (Cl. 196—52)

This invention relates to methods and apparatus for catalytic processing and more particularly to such methods and apparatus employing powdered catalysts. It also relates generally to methods and apparatus for contacting vapors with a suspended powdered solid.

In a variety of catalytic processes, it has been found advantageous to utilize solid catalysts in powdered form. These cata'ysts are suspended in the vapors to be processed or converted and the powdered catalyst is then separated from the reaction products. In many instances the catalyst requires revivification to burn off carbonaceous deposits or to remove other impurities and such revivification can be accomplished by suspending the powdered catalyst in a revivifying gas followed by separation of the catalyst and return of it to the reaction zone.

This type of process is of particular utility in the art of converting petroleum or other hydrocarbons and still more particularly in such processes as catalytic cracking, catalytic reforming, catalytic dehydrogenation and aromatization, catalytic isomerization and other catalyzed conversion reactions. It is likewise applicable to oxidation and other reactions involving non-hydrocarbon as well as hydrocarbon vapors.

In the various processes which are susceptible to influence by powdered catalysts, it is often highly advantageous and sometimes imperative to utilize very high ratios of the amount of catalyst to the amount of reacting vapors. Thus ratios of 2 to 1, 3 to 1 or even 5 to 1 on a weight basis are not at all unusual and ratios as high as 20 to 1 are sometimes preferred in such processes as catalytic cracking of gas oil and particularly catalytic reforming of naphthas. These high ratios of catalyst to reactants necessarily entail serious problems both in handling such concentrated suspensions and in the expense involved in the use of these very large amounts of catalyst.

Accordingly it has been found desirable to carry out such reactions in enlarged upflow reactors in which the catalyst and reactant vapors are both supplied near the bottom of the reactor and in which the vapor velocity and catalyst particle size are so proportioned that the catalyst particles do not pass upward at the same rate as the vapor but rather slip downward with reference to the vapor stream although moving, on the average, slowly upward with reference to the reactor. The result is that a high catalyst to reactant ratio is built up within the reactor but a relatively low ratio of catalyst to reactant is charged to the apparatus. Ultimately the catalyst particles pass out of the reactor at the top and are then separated from the vapors, revivified and returned.

The revivification can be accomplished by the use of a simple type of reaction vessel, suspending the catalyst in air, a mixture of flue gas and air or other oxidizing gas, in order to burn off from the catalyst particles the carbonaceous deposits, the removal of which is normally the main objective of the revivification reaction.

While these upflow reactors are markedly advantageous, those known to the art prior to my invention have been subject to certain serious disadvantages.

One of the most serious of these disadvantages is that when built in the sizes required for commercial processing and particularly in the very large sizes necessary to handle the volumes involved in petroleum conversion units such as catalytic cracking and catalytic reforming units, a type of channeling tends to occur in the reactor with the result that the bulk of the vapors tend to pass upward in a column or "chimney" within the reactor and the catalyst tends to pass downward in one or more similar columns with the result that the contacting of the catalyst with the vapors is very incomplete and highly non-uniform. Other types of uncontrolled turbulence likewise occur with these same results of incomplete and non-uniform contacting of vapors and catalyst.

Another disadvantage commonly encountered in this type of system is that the powdered catalyst tends to agglomerate into small, hard masses or beads probably as a result of the revivification reaction, and the agglomerated particles with their high sedimentation rates are not handled efficient'y and effectively by the upflow reactors.

The objects of my invention include the elimination of the difficulties above outlined and other difficulties heretofore encountered in connection with the use of powdered catalyst systems and other systems in which vapors are contacted with suspended powdered solids.

More particularly it is an object of my invention to eliminate uncontrolled turbulence and channeling in the use of upflow reactors of the type heretofore described. A related object of my invention is to provide improved and controlled contacting in systems employing high ratios of catalyst to vapors.

A further object of my invention is to eliminate the problems incident to the formation of larger agglomerates or beads in powdered catalyst systems and to render the material of which these agglomerates or beads are composed efficiently and continuously utilizable in the process.

It is also an object of my invention to provide methods and apparatus for reactions of the powdered catalyst type which will make possible the use of concentrated suspensions of the powdered catalyst in the vapors contacted therewith and which will make possible the efficient use of powdered catalysts having a relatively wide range of particle sizes.

Other and more detailed objects, advantages and uses of my invention will become apparent as the description thereof proceeds.

Briefly, I utilize an upflow reactor, which may be referred to as a retarded settling reactor, in which there are alternate zones of high and low vapor velocity with the result that in the zones of low vapor velocity sedimentation occurs to a large extent with consequent building up of high catalyst to vapor ratios while in the zones of high vapor velocity the catalyst is redistributed in the vapors and any channeling which may occur in any given low vapor velocity zone cannot extend to the next such zone so that the vapors and catalyst passing through the apparatus are uniformly contacted with each other. The high velocity zones also act as a seal or "lock" to prevent catalyst passing downward through the reactor counter to the vapor stream.

In one form of my invention I also provide equipment whereby the larger catalyst particles, either those present in the catalyst originally supplied to the process or those formed by agglomeration in the course of the use of the catalyst, or both, are settled out at the bottom of the reactor and are continuously reground and resuspended in the vapors so that they are always efficiently utilized and never build up in undesirable quantities.

My invention will now be described with particular reference to the accompanying drawings which show certain embodiments of my invention in highly diagrammatic form and in which:

Figure 1 is a simplified diagrammatic elevation of one embodiment of my invention applied both to a powdered catalyst reaction system and to an associated powdered catalyst revivification system;

Figure 2 is an elevation, partly in section, illustrating one way in which the grids shown in Figure 1 can be made adjustable;

Figure 3 is an elevation, partly in section, showing an alternative type of reactor preferably used in powdered catalyst conversion reactions but also adapted to regeneration reactions;

Figure 4 is a sectional detail elevation illustrating a still further alternative form of reactor; and Figure 5 is a horizontal section taken along the line 5—5 of Figure 4.

Referring to the drawings in more detail, Figure 1 illustrates the application of my invention to the cracking of hydrocarbon oils although it will be understood readily that similar apparatus and similar process steps can be applied to other processes as hereinbefore indicated. In Figure 1 the charging stock which is preferably a virgin gas oil, but which can be a heavy naphtha or other vaporizable hydrocarbon stock, is charged through line 11 to the coils 12 of furnace 13 and is heated to the desired reaction temperature, for instance from about 850° F. to about 1050° F. The charge is vaporized in furnace 13 and the vapors passing through transfer line 14 and valve 15 pick up fresh powdered catalyst from hopper or receiver 16 equipped with rotary valve 17. As shown, this is accomplished by the use of eductor 18 but in many instances it is necessary to pump this catalyst into the hydrocarbon stream or to use a tall standpipe of catalyst or other means for getting the catalyst into the vapor stream which is normally at somewhat elevated pressure. The pressure utilized may merely be sufficient to overcome the pressure drops in the apparatus and is normally relatively low, usually not more than about 50 pounds per square inch.

The particular catalyst utilized does not form any essential part of the present invention and a great variety of catalysts are known to the art. Thus, for instance, various natural and acid-treated clays, for instance acid-treated bentonitic material such as Super Filtrol, can be used and a large variety of synthetic catalysts such as alumina deposited on silica, magnesia deposited on silica or the like can be utilized in the case of catalytic cracking and other catalysts known to the art or hereinafter developed can be utilized in other types of conversion processes.

Similarly the size of the catalyst particle can be widely varied, ranging, for instance, from 50 mesh to 400 mesh or even finer, typically 200 mesh. As will subsequently be pointed out, the powdered catalyst can have a rather wide range of particle sizes and this constitutes one of the advantages of my invention over prior art methods and apparatus. Thus if the catalyst used is classified as to catalyst size the particle size in the ninetieth percentile (i. e. the size of those particles which are larger than 90% of the particles but smaller than 9% of the particles) can be three or four or even more times the particle size in the tenth percentile.

The weight ratio of catalyst to charging stock can be varied within rather wide ranges, for instance from 1 to 1 to 5 to 1, typically 2 to 1, but the ratio built up within the low velocity zones of the reactor will be much higher as will hereinafter appear. In special cases higher or lower ratios of catalyst to oil, for example, as low as ¼ to 1 and as high as 10 to 1 parts of catalyst per part of oil may be used.

Reverting to Figure 1, the stream of reactant vapors, in this case vaporized hydrocarbon charging stock, carrying suspended powdered catalyst is introduced through line 19 into an elongated upflow reactor 20 of the retarded settling type to which reference has been hereinbefore made. Instead of introducing the vapor and catalyst together, the catalyst can be introduced directly into the reactor and the vapor can be introduced into the reactor at a point lower than the point at which the catalyst is introduced.

As shown, the vapors and suspended catalyst enter a low velocity zone 21. The charge rate, catalyst size and cross sectional area of the reactor are so proportioned that retarded settling occurs within low velocity zones 21, 22, 23 and 24. In other words, on the average, the catalyst particles tend to fall downward with reference to the vapors but their average rate of slip is less than the vapor velocity so that on the average the catalyst particles move upwards with reference to the reactor although moving downward with reference to the upflowing vapor stream.

The various variables, notably particle size, charging rate and reactor cross section are preferably so proportioned that the weight ratio of catalyst to vapors within retarded settling zones 21, 22, 23 and 24 is from 50% to 1000% greater, preferably at least 100% greater, than the charge ratio of catalyst to oil. This gives the effect of high catalyst to oil ratio within the low velocity zones of the reactor and at the same time keeps down the necessary charge ratio of catalyst to oil.

In order to prevent channeling and uncontrolled turbulence the catalyst and oil are redistributed at various points in the reactor 20 by means of grids 25 which are provided with uniformly distributed openings 26 and these openings form high velocity zones interposed between successive low velocity zones. The velocity within the openings 26 in grids 25, i. e. within the high velocity zones, are such that the catalyst particles pass almost wholly upwards and only a little of the coarsest material passes downward through these grids. Thus the vapor velocity in the high velocity zones can be equal to the sedimentation rate of some size of particles lying somewhere between the fiftieth and the ninetieth percentiles. In fact the grids can advantageously be so designed that practically no material passes downward through them. Either effect can be accomplished by proper proportioning of the total cross sectional area of openings 26 in grids 25 to the total internal cross sectional area of the reactor 20 so as to give the desired increase in velocity within the high velocity zones. (It will be understood, of course, that most if not all of the particles, if any, passing downward through the grids will ultimately pass upward through them once more without regrinding and the remainder, if any, can be reground as will hereinafter appear.)

Typically the total cross sectional area of the openings 26 in one of grids 25 should be from 10% to 50%, for instance about 20%, of the total internal cross sectional area of the reactor, the velocity of the vapors passing through the openings in the grids being correspondingly increased about two to nine times.

By having a series of these low velocity zones 21, etc. with high velocity zones interposed between them, any channeling or uncontrolled turbulence within any one of the low velocity zones is kept from being transmitted into the next higher low velocity zone and thus the contact between the vapors and the catalyst is rendered much more uniform than would otherwise be the case. The use of a large number of relatively small openings is also more advantageous than the use of a single opening of restricted cross section between adjacent low velocity zones since the relatively high velocity streams entering one of the low velocity zones from the grid immediately below are absorbed without creating any major turbulence or, in other words, any serious channeling of a type which would interfere with proper contacting. It will be understood, however, that the alternate low and high velocity zones can be of any desired form and that the use of grids is merely illustrative.

As shown, the lowermost low velocity zone 21 can be designed to give slightly higher average vapor velocities than the upper low velocity zones 22, 23 and 24. One advantageous way of accomplishing this is to make this lowermost low velocity zone of tapered cross section so that the velocity diminishes with upward progress through this zone. The purpose of this is that any relatively heavy catalyst particles tend to be carried upward into the next higher low velocity zone 22 rather than accumulating in the lowermost of zone 21. In spite of this, under many conditions a small amount of the very heaviest material such as the "beads" formed by the agglomeration of catalyst particles, as previously described, will pass downward to the bottom of the reactor.

Advantageously these heaviest catalyst particles can pass from the bottom of the reactor into a pulverizer 27 which can be of any desired type, for instance, a Raymond type pulverizer, driven by pulley 28 from a source of power not shown. In this pulverizer the agglomerates or other large and heavy particles are pulverized or repulverized and they can then be resuspended by continuous or continual introduction of a portion of the charge vapors to the pulverizer by means of valve 29 and line 30. Steam or other gas or vapor can be used for this purpose. Also the pulverized material can be introduced into any of the zones or elsewhere in the system although reintroducing them into lowermost low velocity zone 21 is particularly convenient and advantageous.

Thus the heaviest particles passing downward to the pulverizer are comminuted and then picked up and passed upward into the system once more so that they never build up in undesirable quantities and are always available for efficient utilization.

From the top of the reactor 20 the stream of vapors and catalyst pass through transfer line 31 to a suitable separator which can, for instance, be cyclone separator 32. If desired, two or more of these cyclone separators can be used in series or other auxiliary means for removing the last traces of the catalyst can be employed.

The catalyst-free vapors pass out from cyclone separator 32 through line 33 to fractionating column 34 equipped with dephlegmating coil 36 and reboiler coil 37 and this fractionator can be operated so as to withdraw from the bottom thereof through valved line 38 the material heavier than gasoline known as cycle stock, catalytically cracked gas oil or middle oil and this can be removed from the system or recycled as a portion of the feed or charging stock.

From the top of fractionator 34 the gasoline and lighter hydrocarbons pass out through line 39 and condenser coil 40 to separator 41. The condenser coil 40 can be so operated that the liquid withdrawn from the bottom of separator 41 through valved line 42 is predominantly gasoline while the lighter gases pass off from the top of the separator through valved line 43. Various more complicated fractionation and stabilization systems can and generally will be used as is well known to those skilled in the art. In general I have endeavored to show my invention in one of its simplest forms without any attempt to illustrate all the engineering details which are desirable in connection with a commercial installation but which are well within the skill of those familiar with this art.

From the bottom of cyclone separator 32 the spent powdered catalyst is withdrawn through rotary valve 44. If desired a portion of this can be recycled directly to the reactor but all or part of it must be regenerated. This regeneration is usually accomplished by oxidation with air, a mixture of flue gas and air, or some other oxidizing gas in order to remove carbonaceous impurities. It can be advantageously regenerated or revivified using apparatus similar to reactor 20; in other words, apparatus with successive high velocity and low velocity zones.

In the form shown, the powdered catalyst passes through line 45 to eductor 46 where it is picked up by steam from line 47 and carried into the revivification apparatus 48. If desired this eductor can be operated by the use of the revivification gas or a pump or other catalyst transferring apparatus can be utilized. However, one of the advantages of my revivification apparatus is its low pressure drops as compared with the systems with small tubes heretofore usually contemplated and this greatly simplifies the catalyst transfer problem, making it possible to utilize eductors in place of more complicated catalyst transfer apparatus, pumps, etc.

In the revivification step the powdered catalyst is suspended in steam or other fluid entering the revivification apparatus, preferably at the bottom of the lowermost of a plurality of low velocity zones 49. These low velocity zones 49 and the alternate high velocity zones can be constructed as in the case of reactor 20 and a bottom pulverizer can similarly be used. However, in the preferred form shown the low velocity zones are delimited by pancake coils 50 through which a cooling medium is circulated as will later be described. The openings between these pancake coils form the high velocity zones and can suitably have cross sectional areas within the range pointed out in the case of reactor 20. They serve the purpose of grids 25 in reactor 20 as well as providing for the circulation of cooling medium to keep the exothermic revivification reaction from increasing the temperature to a point which would injure the catalyst. Usually the revivification temperature is maintained within the range from about 900° F. to about 1100° F.

Air or other revivification gas is introduced from line 51, header 52 and valve 53 into a perforate distributing coil 54 located below the lowermost pancake coil 50, thus picking up the powdered catalyst and carrying it through the lowermost low velocity zone 49 and thence through the high velocity zones which constitute the openings within the pancake coils and through the successive low velocity zones 49 to the top of the revivification reactor. Additional air or other revivification gas can advantageously be supplied at progressive points in the revivification reactor, for instance below each or any of the upper pancake coils 50 by means of the corresponding perforate distributing coils 54 which are under the control of valves 55. Steam or other diluent gas such as flue gas can likewise be introduced at any or all of these points through line 56, manifold 57, valves 58 and distributing coils 54.

As previously mentioned, the temperature of the revivification can be kept under control by circulating any desired cooling medium through pancake coils 50 by means of line 59, header 60 and valves 61. From the pancake coils the cooling medium passes out through lines 62, header 63, valves 64, header 65 and line 66. If so desired, the cooling medium can be passed through various pancake coils in series rather than in parallel. A preferred cooling medium is molten salts, for instance.

The design of revivification reactor 48 with alternate low and high velocity zones has the advantages previously outlined in the case of conversion reactor 20 and in particular has the advantage of providing a revivification reactor of very low pressure drop which greatly simplifies the problem of introducing the catalyst into this reactor.

Material from the top of revivification reactor 48 passes through line 67 to separator 68 which can be a cyclone separator as shown and the regenerated catalyst from the bottom of this separator can be passed via valved line 69 into powdered catalyst hopper 16. The spent revivification or regeneration gas can be passed out of the cyclone separator through line 70.

The grids 25 of contactor 20 in Figure 1 can be made adjustable and the openings between the cooling coils 50 in revivification reactor 48 can likewise be made controllable if desired. One method of control is shown in Figure 2 which illustrates an alternative form of reactor 20a.

In Figure 2 the grids are composed of vanes 71 arranged in uniformly distributed apertures in plate 72. The position of vanes 71 can be adjusted by rotating control handles 73 so as to place them at any desired angle, thus controlling the size of the openings between the grids or, in other words, controlling the vapor velocity in the high velocity zones. Handles 73 are attached to shafts 74 which pass through threaded bosses 75 and terminate in links 76 which are attached to frames 77 which actuate vanes 71 through pivots 78.

An alternative form of reactor, 20b, is shown in Figure 3. In this form each low velocity zone is tapered with the large end upward. The result of this is that within each low velocity zone the vapor velocity decreases progressively as the vapors pass upwardly through the low velocity zone and then increases suddenly and greatly as the vapors pass through the high velocity zones comprising the openings between the low velocity sections. The connecting passages may be defined by grids or grills 25b which separate the low velocity zones.

As the vapor velocity decreases upwardly within one of the low velocity zones due to its taper the force suspending the powdered catalyst decreases with the result that the ratio of catalyst to vapors decreases or, in other words, the average specific gravity of the material present in the low velocity zone between two grids decreases with increasing elevation within that zone. This makes for improved stability since the low specific gravity material does not tend to channel downward as is sometimes the case when the average specific gravity is uniform throughout the whole low velocity zone. Thus contacting is improved as a result of the streamline flow.

It will be noted that the upper portion 79 of the walls defining each low velocity zone can be made straight rather than tapered if desired.

The advantage of tapered low velocity zones is still further enhanced if the vapors and catalyst entering the low velocity zone are given a whirling or centrifugal action, thereby improving the degree of contacting, lengthening the path of the vapors and catalyst, and giving controlled turbulence. This result can be accomplished, as shown in Figures 4 and 5, by warping grids 25c into vanes in such manner as to direct the material passing through these grids tangentially.

One simple way of accomplishing this, as shown in Figures 4 and 5, is to form these grids or grills from sheet metal by making radial cuts in the sheet metal and then raising the metal to a diagonal position at each one of the cuts to form baffles 80 so that the upflowing materials are directed tangentially or spirally or, in other words, given a horizontal as well as a vertical component thus giving a controlled swirling motion. As a result of this rotating movement of the vapors and catalyst mixture within the low velocity zones of the contactor, a portion of the catalyst is thrown by centrifugal action to the sides of the low velocity zones where it escapes the principal force of the vapors and falls back into the vortex of the vapor stream at grid 25c. The catalyst is there again picked up and recirculated within the low velocity contacting stage 79c. In this manner the catalyst is exposed to the action of the hydrocarbon vapors for a considerably longer period of time than would be the case were it allowed to travel directly through the contacting zone without rotational effect.

While I have described my invention in connection with certain specific embodiments thereof, it is to be understood that these are by way of illustration rather than by way of limitation and that I do not mean to be restricted thereto but only to the scope of the appended claims.

I claim:

1. In a catalytic conversion system wherein powdered catalyst is suspended in charging stock vapors, passed through an up-flow reactor, separated from reaction vapors, suspended in regeneration gas, passed through an up-flow regeneration chamber, separated from regeneration gas and reintroduced into further amounts of charging stock vapors and wherein the catalyst particles tend to agglomerate during continued use of the system, the method of operation which comprises regulating the vertical gas or vapor velocity in one of said up-flow chambers to permit agglomerated catalyst particles to settle to the base of said up-flow chamber while maintaining the unagglomerated particles in suspension, withdrawing the agglomerated particles from the base of said up-flow chamber, pulverizing said withdrawn particles and reintroducing said pulverized catalyst into the system.

2. An apparatus for contacting gases or vapors with a suspended powdered solid which comprises an upflow contacting chamber of increasing diameter from the bottom thereof to a point adjacent the top thereof, means for introducing powdered solids suspended in gases or vapors at the bottom of said chamber, an outlet of relatively small cross-sectional area at the top of said chamber, a second upflow contacting chamber of increasing diameter from the bottom thereof to a point adjacent the top thereof, the bottom of said second chamber communicating with the small cross-sectional area outlet of the first chamber, a discharge means of relatively small cross-sectional area leading from the upper part of said second contacting chamber and means at the base of said second contacting chamber for directing the upflowing stream tangentially thereto.

3. An apparatus for effecting catalytic conversion of hydrocarbons by means of a powdered catalyst which apparatus comprises a powdered catalyst receiver, a substantially vertical conduit depending from said receiver and communicating therewith, means for vaporizing a hydrocarbon charging stock, a vapor transfer line leading from said vaporizing means to and from the base of said conduit and so constructed and arranged that catalyst from said conduit may be suspended in charging stock vapors in said transfer line and conveyed thereby to a low point in a first vertical upflow contacting chamber, a first vertical upflow contacting chamber of sufficient diameter to permit a ratio of catalyst to charging stock vapors therein which is higher than the ratio of catalyst to charging stock vapors in the transfer line, said chamber being constructed and arranged to receive charging stock vapors and powdered catalyst from said transfer line, means in said first vertical upflow contacting chamber for dividing said chamber into a plurality of separate contacting zones and for tangentially distributing catalyst and vapors from a preceding to a succeeding zone, means for separating catalyst from reaction vapors, a second substantially vertical conduit depending from said catalyst separating means, a second upflow contacting chamber, means for suspending catalyst in a gaseous stream at the base of said second conduit and for introducing said suspended catalyst at a low point in said second upflow contacting chamber, means for abstracting heat from catalyst in said second contacting chamber and means for separating catalyst from gases leaving said second contacting chamber and for returning said separated catalyst to said first catalyst receiver.

4. An apparatus for effecting catalytic conversion of hydrocarbons by means of a powdered catalyst which apparatus comprises a powdered catalyst receiver, a substantially vertical conduit depending from said receiver and communicating therewith, means for vaporizing a hydrocarbon charging stock, a vapor transfer line leading from said vaporizing means to and from the base of said conduit and so constructed and arranged that catalyst from said conduit may be suspended in charging stock vapors in said transfer line and conveyed thereby to a low point in a first vertical upflow contacting chamber, a first vertical upflow contacting chamber of sufficient diameter to permit a ratio of catalyst to charging stock vapors therein which is higher than the ratio of catalyst to charging stock vapors in the transfer line, means for separating catalyst from reaction vapors, a substantially vertical conduit depending from said catalyst separating means, a second vertical upflow contacting chamber, means for abstracting heat from catalyst comprising a substantially horizontal heat exchanger within the second contacting chamber itself, said means being constructed and arranged for subdividing said second vertical upflow contacting chamber into a plurality of separate contacting zones and for distributing catalyst from the zone on one side of said distributing means to the zone on the other side thereof, means for suspending catalyst in a gaseous stream at the base of said second conduit and for introducing said suspended catalyst at a low point in said second vertical upflow contacting chamber, and means for separating catalyst from gases leaving said second contacting chamber and for returning said separated catalyst to said first catalyst receiver.

VANDERVEER VOORHEES.

REFERENCES CITED

The following references are of record in the file of this patent:

UNITED STATES PATENTS

| Number | Name | Date |
|---|---|---|
| 1,873,783 | Osterstrom | Aug. 23, 1932 |
| 1,799,858 | Miller | Apr. 7, 1931 |
| 2,216,470 | Forney | Oct. 1, 1940 |
| 2,001,907 | Ipatieff | May 21, 1935 |
| 2,259,487 | Payne | Oct. 21, 1941 |
| 2,231,231 | Subkow | Feb. 11, 1941 |
| 2,248,196 | Plummer | July 8, 1941 |
| 2,253,486 | Belchetz | Aug. 19, 1941 |
| 2,296,722 | Marancik et al. | Sept. 22, 1942 |
| 2,355,016 | Stein, Jr. | Aug. 1, 1944 |

FOREIGN PATENTS

| Number | Country | Date |
|---|---|---|
| 23,045 | Great Britain | Oct. 5, 1910 |
| 255,159 | Great Britain | July 19, 1926 |
| 498,094 | Great Britain | Jan. 3, 1939 |